United States Patent [19]

Taylor

[11] Patent Number: 4,961,759
[45] Date of Patent: * Oct. 9, 1990

[54] CLOSED LOOP GAS DEHYDRATION PROCESS AND APPARATUS

[75] Inventor: John A. Taylor, Pinckney, Mich.

[73] Assignee: Separation Dynamics, Inc., Southfield, Mich.

[ * ] Notice: The portion of the term of this patent subsequent to Aug. 15, 2006 has been disclaimed.

[21] Appl. No.: 394,954

[22] Filed: Aug. 17, 1989

[51] Int. Cl.[5] ...................... B01D 53/22; B01D 71/10
[52] U.S. Cl. ............................................ 55/16; 55/158
[58] Field of Search .............................. 55/16, 68, 158; 210/654; 264/40.3

[56] References Cited

U.S. PATENT DOCUMENTS

| | | | |
|---|---|---|---|
| 1,496,757 | 6/1924 | Lewis et al. | 55/16 |
| 2,981,680 | 4/1961 | Binning | 55/16 X |
| 3,144,313 | 8/1964 | Pfefferle | 55/16 |
| 3,339,341 | 9/1967 | Maxwell et al. | 55/16 |
| 3,367,850 | 2/1968 | Johnson | 55/16 X |
| 3,661,724 | 5/1972 | Stickler | 55/16 X |
| 3,735,558 | 5/1973 | Starstrom et al. | 55/16 |
| 3,735,559 | 5/1973 | Salemme | 55/16 |
| 4,288,494 | 9/1981 | Porter et al. | 210/645 X |
| 4,497,640 | 2/1985 | Fournié et al. | 55/16 |
| 4,718,921 | 11/1988 | Makino et al. | 55/16 |
| 4,857,081 | 8/1989 | Taylor | 55/16 |

FOREIGN PATENT DOCUMENTS

| | | | |
|---|---|---|---|
| 53-145343 | 12/1978 | Japan | 55/16 |
| 54-006345 | 1/1979 | Japan | 55/16 |
| 54-152679 | 12/1979 | Japan | 55/16 |
| 61-187918 | 8/1986 | Japan | 55/16 |
| 62-042722 | 2/1987 | Japan | 55/16 |
| 62-191017 | 8/1987 | Japan | 55/16 |
| 62-192589 | 8/1987 | Japan | 55/16 |
| 62-241527 | 10/1987 | Japan | 55/16 |
| 2139110 | 11/1984 | United Kingdom | 55/16 |

*Primary Examiner*—Robert Spitzer
*Attorney, Agent, or Firm*—Reising, Ethington, Barnard, Perry & Milton

[57] ABSTRACT

An apparatus (10) for drying a wet stream of hydrocarbon gas includes a plurality of hollow fiber membranes (40) for osmotically imbibing water from a wet gas stream flowing on one side (48) of the membranes and forming a dried retentate stream and diffusing a water permeate to the second side (46) thereof and preventing imbibing and diffusion of hydrocarbon and halogenated hydrocarbons therethrough. The water permeate is removed from the cores (44) of the membranes (40) and the dried hydrocarbon and halogenated hydrocarbon retentate stream is removed from the second side (48) of the membranes (40). A portion of the dried retentate stream is recirculated as the sweep stream through cores (44) of the membranes in a closed fluid flow circuit.

4 Claims, 1 Drawing Sheet

CLOSED LOOP GAS DEHYDRATION PROCESS AND APPARATUS

This invention relates to an apparatus and method for separating water from a water and hydrocarbon and halogenated hydrocarbon mixture. More particularly, the present invention provides a method and apparatus for the dehydration of gases.

BACKGROUND OF THE INVENTION

The separation of water from hydrocarbons and/or halogenated hydrocarbon contaminates found in chemical industrial waste or from gaseous hydrocarbons generally requires a separation system capable of prolonged exposure to hydrocarbons without chemical degeneration or fouling. The allowed copending patent application Ser. No. 194,984 to applicant, filed May 17, 1988 discloses a method for drying a wet stream of hydrocarbon gas by the use of hollow fiber membranes while producing a hydrocarbon free water permeate. The method employs as a membrane, a nonporous self-supported hollow fiber membrane module, the membranes consisting of cuproammonium cellulose hollow fibers. A wet hydrocarbon gas stream is conducted into contact with the outside of the fibers and water is osmotically imbibed independently of convective pressure of the stream of gas from the stream into the fibers while preventing imbibing or permeation of the hydrocarbons and/or halogenated hydrocarbons. The water free of the hydrocarbons and/or halogenated hydrocarbons defuses to the bores of the fibers. The imbibed water free of the hydrocarbons and/or halogenated hydrocarbons is removed from the inside of the bores and the dry gas is removed from the outside of the membrane. The apparatus provides the ability in a process to osmotically imbibe water independently of convective pressure of the stream of gas from the stream into the fibers while preventing imbibing or permeation of hydrocarbons and diffusing the water free of hydrocarbon to the bores of the fibers.

The aforementioned process can utilize a sweep stream of dry air flowing within the bores of the hollow fibers which carries away water molecules as they appear on the inner surface or wall of the membrane fibers. Water immerging on the inner wall of the fibers is continuously removed by the sweep stream. Thus, the membranes are diffusion means consisting essentially of unsupported, nonporous cuproammonium cellulose having continuous uninterrupted services. The sweep stream provides water removing means for driving the diffusion dynamics and essentially drying the gas retentate. The sweep stream, acting as the water removing means, in combination with the ultra thin cuproammonium cellulose membranes and the unobstructed nonporous membrane surface, provide significantly improved results in separation dynamics when compared to prior art systems.

It is desirable to increase the efficiency of the aforementioned systems while decreasing the cost of the operation. One source of cost is the continual use of dry air from a dry air source for providing the sweep stream. The present invention provides means for increasing the efficiency of the inventive apparatus for drying the wet gas stream and lowering the cost of the operation of the same while not at all decreasing the capacity or capability of the apparatus.

SUMMARY OF THE INVENTION

In accordance with the present invention, there is provided an apparatus for drying a wet stream of hydrocarbon gas, the apparatus including hollow fiber separation means for osmotically imbibing water from a wet gas stream flowing on one side of the hollow fiber separation means and forming a dried retentate stream and diffusing a water permeate to a second side thereof and preventing imbibing and diffusion of hydrocarbon and halogenated hydrocarbon. The first removing means forming a sweep stream removes the water permeate from the second side of the hollow fiber separation means. Second removing means removes the dried hydrocarbon and halogenated hydrocarbon retentate stream. The second removing means includes recirculation means in communication with the first removing means for recirculating a portion of the retentate stream as the sweep stream in a closed fluid flow circuit.

The present invention further provides a method of drying the wet stream of gas, the method including the steps of osmotically imbibing water from a wet gas stream flowing on one side of at least one hollow fiber membrane and forming a dried retentate stream and diffusing a water permeate to second side of the hollow fiber membrane while preventing imbibing and diffusion of hydrocarbons and halogenated hydrocarbons therethrough. A sweep stream is formed and removes the water from the water permeate from the second side of the hollow fiber membrane therewith. The dried retentate stream containing hydrocarbons and halogenated hydrocarbons therein is removed. A portion of the dried retentate stream is recirculated as the sweep stream in the closed fluid circuit.

FIGURES IN THE DRAWINGS

Other advantages of the present invention will be readily appreciated as the same becomes better understood by reference to the following detailed description when considered in connection with the accompanying drawings wherein:

FIG. 1 a schematic diagram of a fluid circuit constructed in accordance with the present invention;

FIG. 2 is a perspective fragmentary view sequentially broken away of a hollow fiber separation module constructed in accordance with the present invention; and FIG. 3 is a schematic fragmentary perspective view of a hollow fiber illustrating the fluid separating the fluid separation process by a hollow fiber separation fiber constructed in accordance with the present invention.

DETAILED DESCRIPTION OF THE INVENTION

Figure 1:
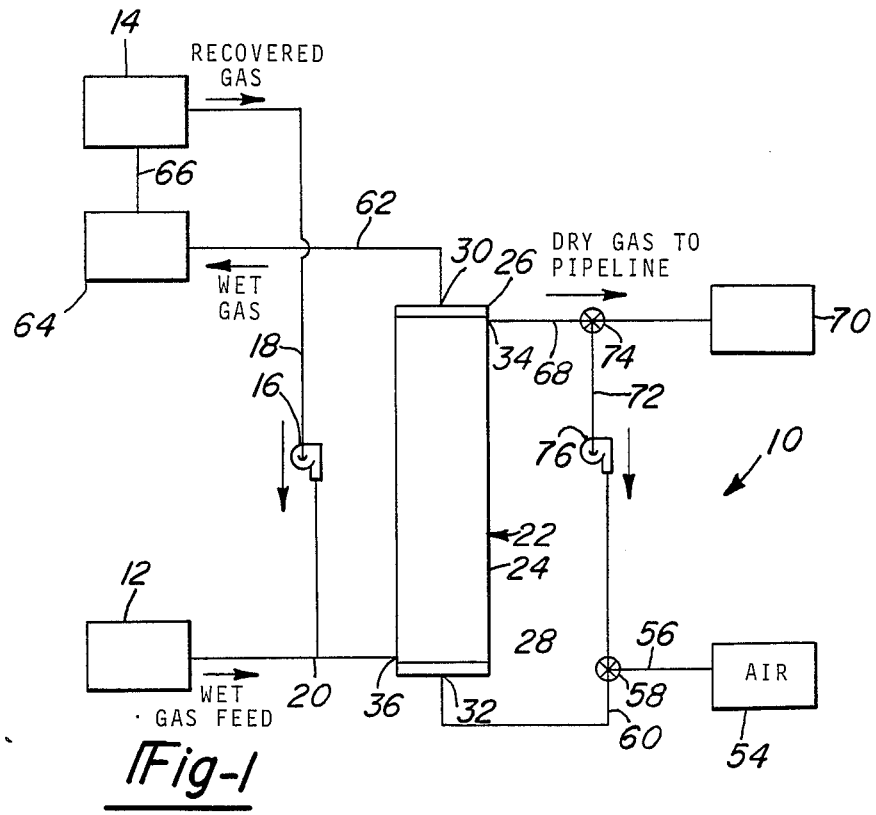
Figure 2:
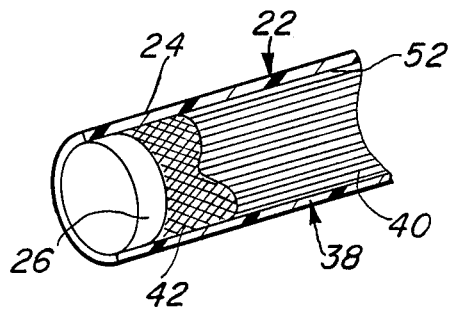

An apparatus constructed in accordance with the present invention is generally shown at 10 in FIG. 1. The apparatus 10 dries a wet stream of hydrocarbon gas from a wet gas source, schematically illustrated at 12. The wet gas source can be derived from an industrial gas stream wherein water vapor is often found as an impurity. The removal of the water vapor is required before or during use or processing of the wet gas stream. For example, natural gas, the principal component of which is methane, contains in its natural state substantial quantities of physically entrained water. In numerous industrial processes, it is desirable or necessary that such gas be dried. The wet gas can also be initially processed at a second station 14. The gas recovered at station 14 is pumped by a pumping mechanism schematically shown at 16 through conduit 18 to conduit 20. Conduit 20 is in fluid communication between wet gas source 12 and a fluid separation module generally shown at 22.

Arrows in FIG. 1 indicate fluid flow direction through adjacent conduit.

The separation module 22 comprises shell or housing 24 having a generally cylindrical shape. The respective ends of the housing 24 include the caps 26,28. Each cap 26,28 includes a port 30,32 respectively.

Adjacent to respective ends of the housing 22, and extending into fluid communication with the interior of the housing 22, are respective ports 34,36.

Extending axially within the housing 22 and forming a membrane designated generally by the reference numeral 38 is a bundle of hollow hydrophilic fibers 40. The fibers 40 are made of regenerated cuproammonium cellulose, preferably having an internal (bore) diameter of about 200 microns (plus or minus 10%). By regenerated cellulose, it is meant that the cellulose used is cuproammonium regenerated cellulose or viscous cellulose. Cuproammonium regenerated cellulose is nonchemically derivatized cellulose in substantially its natural state. The cuproammonium regenerated cellulose is chemically sheets of cellulose molecules. There is heavy hydrogen bonding between the sheets creating a highly crystalline structure. The structure is quite hydrophilic and provides aqueous pathways for water dissolved water soluble materials to diffuse. The cuproammonium regenerated cellulose provides membranes which are significantly thinner than membranes made by chemically derivatized cellulose materials, such as cellulose acetate. Further, the membranes are nonporous as compared to porous cellulose acetate. Materials diffusing through the cuproammonium cellulose membranes travel a significantly smaller distance than materials traveling through cellulose acetate membranes. Thus, the cuproammonium cellulose membranes have a significant positive effect on the flow dynamics by presenting a significantly smaller yet more effective barrier over which only the diffusing water and dissolved water soluble components pass. The 15 membranes resist fouling while providing unexpected ability to continuously separate water from water-hydrocarbon and/or water-halogenated hydrocarbon mixtures without fouling. The membranes are discussed in detail in the copending U.S. patent application Ser. No. 194,984, U.S. Pat. No. 4,857,081, to applicant.

Techniques for making the hollow fiber membranes of the kind satisfactory for use in the present invention are disclosed in Christopher H. Porter and John Taylor U.S. Pat. No. 4,288,494 issued Sept. 8, 1981, and Porter and Taylor U.S. Pat. No. 4,333,906 issued June 8, 1982. Such other techniques as may occur to those skilled in the art may also be used.

A screen 42 may be provided, if desired, between the bundle of membranes 40 and the outer shell 24 to stabilize the membranes 40 and reinforce it structurally but the individual fibers are not externally supported.

The module 22 provides two distinct fluid flow paths therethrough. Fluid admitted through port 36 will flow axially within the housing 22 in contact with the external surface of the fibers 40 and axially within the housing 22 towards port 34 thereby providing means for conducting fluid from the wet gas 15 source 12 into the module 22 through inlet 36 and out through port 34.

Each of the fibers 40 includes an inner core 44 defined by the inner surface 46 of each membrane 40. The core 44 of each membrane 40 is in fluid communication between inlet 32 and outlet 30.

Figure 3:
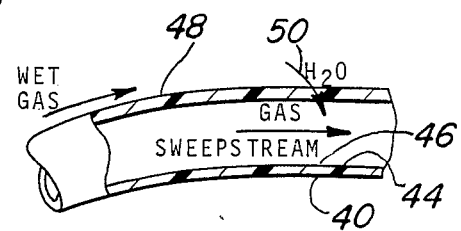

The function of the hollow fiber membranes 40 is illustrated in FIG. 3. Each hollow fiber 40 provides hollow fiber separation means for osmotically imbibing water from the wet gas stream flowing over the outer surface 48 of the membrane 40 on one side of the hollow fiber membrane 40 and forming a dried retentate stream. As shown by arrow 50, the membranes 40 effectively and efficiently imbibe water from the wet gas stream forming the dried retentate stream. A water permeate schematically illustrated in FIG. 3 diffuses to the inside surface 46 of the membrane 40, the membrane 40 preventing imbibing and diffusion of hydrocarbons and halogenated hydrocarbons therethrough. The shell 24 has an inner surface 52 which forms the inner chamber of the module between the inner surface 52 and outer surface 50 of the membranes 40.

An air source 54 provides dry air through conduit 56. Valve 58 allows the sweep stream of dry air to flow through conduit 60 which is in fluid 15 communication with the sweep stream inlet 32. The sweep stream provides a first removing means for removing the water permeate from the inside surface 46 of the hollow fibers 40. The sweep stream containing the wet gas exits the module 23 through outlet 30 and is carried by conduit 62 to a recovery storage 64. The recovery storage 64 can be operatively connected to source 14 for returning wet gas to the system 10. Conduit mechanism 66 is schematically shown in FIG. 1 as communicating between chamber 64 and source 14. The dried hydrocarbon and halogenated hydrocarbon retentate stream is removed from module 22 through outlet 34 which is in fluid communication with conduit 68. Conduit 68 can be in fluid communication with a pipe line 70 which removes the dry gas from the system 10. Pump 16 or additional pumping mechanisms can provide the second removing means for removing the dried gas stream from the module 22. Pumps may also be provided up stream on conduit 68 or within the pipe line system 70 for pulling the dried hydrocarbon and halogenated hydrocarbon retentate stream from the module 22.

The invention provides recirculation means in communication with the first removing means for recirculating a portion of the retentate stream as the sweep stream in a closed fluid circuit. More specifically, the recirculation means includes the valve 58 and a further conduit 72 which is in communication by valve 74 with conduit 68 and conduit 60. Valve 58 selectively allows fluid flow from either the dry sweep stream source of dry air 54 and conduit 56 or the dry gas retentate outlet 34 through conduits 68,72. A pumping mechanism 76 may also drive the fluid flow through conduit 72 and increase the efficiency of the fluid flow through conduit 60 as well as through the cores 44 of the membranes 40. Thus the module 22 has a Wet gas inlet 36 and dry gas outlet 34. Module 22 has wet gas inlet 36 and dry gas outlet 34. Module 22 includes a dry sweep stream inlet 32 and wet sweep stream inlet 30. The recirculation means takes a portion of the dry gas exiting the dry gas outlet 34 as controlled by valve 74, valve such as valve 74 being known in the art. The portion of the sweep stream is carried by conduit 72 through valve 58 and conduit 60 so as to provide a closed sweep stream circuit using as a sweep stream a portion of the dry gas produced by the system 10.

The present invention further provides a method of drying the wet stream of gas, the method generally including the steps of osmotically imbibing water from a wet gas stream flowing on the one side 48 of the membrane 40 and forming a dried retentate stream along the length of the outer surface 48 of the membrane 40. A water permeate diffuses to the second side 46 of the hollow fiber membrane while the hollow fiber membranes 40 prevent imbibing and diffusion of hydrocarbons and halogenated hydrocarbons therethrough. The sweep stream is formed in conduit 60 from the dry air source 54 and removes the water permeate from the second side 46 of the hollow fiber membranes 40 therewith. The dried retentate stream is removed through outlet 34 containing hydrocarbons and halogenated hydrocarbons therein. A portion of the dried retentate stream is recirculated through conduit 72 as the sweep stream through conduit 60 in a closed fluid flow circuit.

In operation, initially the sweep stream start up will be produced utilizing the air source 54. Once dry gas is being produced through module 22, valves 74 and 58 can be adjusted to direct a portion of the dry gas stream through conduits 72 and 60, closing the source of dry gas air 54 from conduit 60. Thusly, efficiency is gained in the system by not requiring an outside air source as a sweep stream. As the dry gas is recirculated through the system and can be redried, there is no loss of 15 efficiency of the system as there is no loss of any amount of the recovered gas.

Alternatively, the sweep stream can be conducted out side of the membranes from inlet 36 to outlet 34 while the wet gas can be conducted through inlet 32 through the cores 44 of the membranes 40, the dry gas exiting outlet 30. In other words, the wet gas can be conducted through the cores 44 of the membranes 40 as the imbibed water travels out to the outer surface 48 of the membranes. The sweep stream would then remove the water from the outer surface 48 of the membranes.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A method of drying a wet stream of gas, said method including the steps of: osmotically imbibing water from a wet gas stream flowing on one side of at least one hollow fiber membrane and forming a dried retentate stream, diffusing a water permeate to a second side of the hollow fiber membrane while preventing imbibing and diffusion of hydrocarbons and halogenated hydrocarbons therethrough; forming a sweep stream and removing the water permeate from the second side of the hollow fiber membrane therewith; and removing the dried retentate stream containing hydrocarbons and halogenated hydrocarbons therein, said method characterized by recirculating a portion of the dried retentate stream as the sweep stream in a closed fluid flow circuit.

2. An apparatus (10) for drying a wet stream of hydrocarbon gas, said apparatus comprising: hollow fiber separation means for osmotically imbibing water from a wet gas stream flowing on the side of said hollow fiber separation means and forming a dried retentate stream and diffusing a water permeate to a second side thereof and preventing imbibing and diffusion of the hydrocarbon and halogenated hydrocarbon; first removing means forming a sweep stream for removing the water permeate from said second side of said hollow fiber separation means; and second removing means for removing the dried hydrocarbon and halogenated hydrocarbon retentate stream, said apparatus characterized by said second removing means including recirculation means in communication with said first removing means for recirculating a portion of said retentate stream as said sweep stream in a closed fluid flow circuit.

3. An apparatus as set forth in claim 2 further characterized by including at least one housing having a wet gas inlet in fluid communication with said first side of said hollow fiber separation a dried gas retentate outlet in fluid communication with said same side, a sweep stream inlet in fluid communication with said second side, a permeate containing sweep stream outlet in fluid communication with said second side, said second removing means including a dry sweep stream source and a first conduit in communication between said dry sweep stream source and said sweep stream inlet, said recirculation means including valve means operatively o connected to said first conduit and a second conduit operatively connected between said dried gas retentate outlet and said valve means, said valve means for selectively flowing fluid from either said dry sweep stream source or said dried gas retentate outlet therethrough 4. An apparatus asset forth in claim 3 further characterized by said hollow fiber separation means including a plurality of nonporous selfsupported hollow fibers of cuproammonium cellulose contained as abundle within said housing, each of said fiber having an inner core contained within said one side of said membrane and an outer surface defining said second side of said membrane, said housing having an inner surface defining a fluid flow passageway between said inner surface thereof and outer surface of said membranes, said wet gas inlet and dry gas retentate outlet being at substantially opposite ends of said fluid flow passageway, said sweep stream inlet and said permeate containing sweep stream outlet being at substantially opposite ends of said inner cores.

* * * * *